United States Patent
Hennis

(10) Patent No.: US 11,149,394 B2
(45) Date of Patent: Oct. 19, 2021

(54) POND SEALING METHOD

(71) Applicant: James A. Hennis, Waynesboro, MS (US)

(72) Inventor: James A. Hennis, Waynesboro, MS (US)

( * ) Notice: Subject to any disclaimer, the term of this patent is extended or adjusted under 35 U.S.C. 154(b) by 238 days.

(21) Appl. No.: 16/089,027

(22) PCT Filed: Aug. 31, 2018

(86) PCT No.: PCT/US2018/049149
§ 371 (c)(1),
(2) Date: Sep. 27, 2018

(87) PCT Pub. No.: WO2019/046753
PCT Pub. Date: Mar. 7, 2019

(65) Prior Publication Data
US 2020/0347567 A1    Nov. 5, 2020

Related U.S. Application Data

(60) Provisional application No. 62/553,314, filed on Sep. 1, 2017.

(51) Int. Cl.
*E02B 3/16* (2006.01)
*E02D 19/16* (2006.01)
(Continued)

(52) U.S. Cl.
CPC ............. *E02B 3/16* (2013.01); *C04B 14/104* (2013.01); *C04B 24/2652* (2013.01);
(Continued)

(58) Field of Classification Search
CPC . E02B 3/121; E02B 3/128; E02B 5/02; E02B 3/16; E02D 19/16; C04B 14/10; C04B 14/104
(Continued)

(56) References Cited

U.S. PATENT DOCUMENTS 3,180,097 A    4/1965  McDowell
3,520,140 A    7/1970  Katzer
(Continued)

FOREIGN PATENT DOCUMENTS

CN    102127292 A    7/2011
CN    105064325 A    11/2015

OTHER PUBLICATIONS

International Search Report and Written Opinion of International Searching Authority in International PCT Application No. PCT/US18/49149, dated Jan. 7, 2019.
(Continued)

*Primary Examiner* — Frederick L Lagman
(74) *Attorney, Agent, or Firm* — Ashley Law Firm P.C.; Stephen S. Ashley, Jr.

(57) ABSTRACT

A method of treating a pond, lake or other body of water to improve the retention of water includes treating the ground at the bed of the pond with bentonite clay, a super absorbent polymer, a polysaccharide, and a polymer flocculant. The bentonite clay can be granulated #16 Wyoming bentonite clay, the super absorbent polymer can be granulated polyacrylamide, the polysaccharide can be granulated carboxy methyl cellulose, and the polymer flocculant can be a high-performance polymer flocculant, such as 2-Propenoic Acid, polymer with 2-Promenamide, sodium salt 90-100%.

18 Claims, 7 Drawing Sheets

(51) Int. Cl.
*E02B 5/02* (2006.01)
*C04B 14/10* (2006.01)
*C04B 24/26* (2006.01)
*C04B 26/28* (2006.01)
*C04B 28/00* (2006.01)
*E02B 1/00* (2006.01)
*E02B 3/12* (2006.01)
*C04B 103/00* (2006.01)
*C04B 111/00* (2006.01)

(52) U.S. Cl.
CPC .......... *C04B 26/285* (2013.01); *C04B 28/001* (2013.01); *E02B 1/00* (2013.01); *E02B 3/128* (2013.01); *E02B 5/02* (2013.01); *E02D 19/16* (2013.01); *C04B 2103/008* (2013.01); *C04B 2103/0051* (2013.01); *C04B 2111/00293* (2013.01); *C04B 2111/00732* (2013.01)

(58) Field of Classification Search
USPC .................................................. 405/270, 17
See application file for complete search history.

(56) References Cited

U.S. PATENT DOCUMENTS

| | | | |
|---|---|---|---|
| 3,736,758 A | 6/1973 | Dolfing et al. | |
| 3,772,893 A | 11/1973 | Eilers | |
| 3,986,365 A | 10/1976 | Hughes | |
| 4,008,854 A * | 2/1977 | Van Der Lely | A01C 15/04 239/655 |
| 4,222,685 A | 9/1980 | Jefferson et al. | |
| 4,261,520 A * | 4/1981 | Hetrick | E01C 19/203 222/413 |
| 4,997,695 A | 3/1991 | Clem | |
| 5,082,500 A | 1/1992 | Nachtman et al. | |
| 5,254,301 A | 10/1993 | Sessions et al. | |
| 5,372,462 A * | 12/1994 | Sydansk | B09C 1/00 166/294 |
| 5,617,920 A * | 4/1997 | Dovan | B01J 13/0065 166/295 |
| 5,749,672 A | 5/1998 | Chamberlain et al. | |
| 5,775,836 A * | 7/1998 | Dean, Jr. | E02B 3/121 405/17 |
| 5,988,534 A * | 11/1999 | Kost | E01C 19/203 239/650 |
| 6,095,720 A | 8/2000 | Stark | |
| 7,306,406 B2 | 12/2007 | Putnam et al. | |
| 7,695,215 B2 * | 4/2010 | Buhr | E02B 3/121 405/17 |
| 8,287,210 B2 * | 10/2012 | Hornaday | B09C 1/08 405/128.45 |
| 8,882,397 B2 * | 11/2014 | Vanni | E02B 3/02 405/270 |
| 2005/0214541 A1 | 9/2005 | Berrada et al. | |
| 2011/0305516 A1 | 12/2011 | Brosenitsch | |
| 2014/0377009 A1 | 12/2014 | Lacazedieu | |
| 2017/0145282 A1 * | 5/2017 | Shumway | C04B 28/02 |

OTHER PUBLICATIONS

Wikipedia Article "Clarifying Agent", https://en.wikipedia.org/w/index.php?title=Clarifying_agent&oldid=752040418, Nov. 29, 2016.
English Translation of Chinese Patent Document No. CN102127292, Aug. 2, 2017.
English Translation of Chinese Patent Document No. CN105064325, Aug. 3, 2017.

* cited by examiner

POND SEALING METHOD

CROSS REFERENCE TO RELATED APPLICATIONS

This application claims priority to U.S. Provisional Patent Application No. 62/553,314, filed Sep. 1, 2017 and incorporated herein.

TECHNICAL FIELD

The present invention relates to civil engineering, and in particular the construction and maintenance of lakes, ponds, and similar bodies of water. An embodiment of the invention comprises a method of treating the bed of a pond to decrease water leakage and improve retention of water within the pond.

BACKGROUND

Lakes, ponds and other small bodies of water can be useful and desirable to property owners for a variety of reasons. Homeowners often wish to have a pond located on their property for aesthetic reasons, and/or for recreational uses such as swimming and/or fishing. In agriculture, lakes and ponds are useful for farming fish. As such, it is often desirable to construct man-made lakes and ponds. However, constructing such lakes and ponds can be problematic as the soil may be easily permeable to water, rendering it unable to retain water. A method of sealing lakes, ponds and other bodies of water so as to improve the retention of water therein is desirable.

U.S. Pat. No. 3,180,097 discloses a process of rendering ground impermeable to water, and is incorporated herein by reference. U.S. Pat. No. 3,736,758 discloses a process for treating non-agricultural grounds to render it impermeable to liquids, and is incorporated herein by reference. U.S. Pat. No. 3,986,365 discloses a soil sealing method, and is incorporated herein by reference.

SUMMARY

An object of the present invention is to provide an efficient method of treating soil to increase the impermeability of the soil to water. Another object of the present invention is to provide a method of treating the bed of a pond, lake or other body of water to improve retention of water therein. These and other objects of the invention can be achieved in various embodiments of the invention disclosed herein.

One embodiment of the invention comprises a method of treating soil to increase water impermeability of the soil.

Another embodiment of the invention comprises a method of treating the ground that comprises the bed of a pond, lake or other body of water to render it substantially impermeable to water.

Another embodiment of the invention comprises a method of treating the wet ground comprising the bed of an existing pond, lake or other body of water to improve the retention of water therein.

Another embodiment of the invention comprises a method of treating dry soil of an empty pond, lake or other body of water so that water will be retained therein.

Another embodiment of the invention comprises a method of improving the clarity of water in a pond, lake or other body of water.

Another embodiment of the invention comprises a pond sealing formulation comprising bentonite clay, a super absorbent polymer, a polysaccharide, and a polymer flocculant.

According to a preferred embodiment of the invention, the bentonite clay comprises #16 Wyoming bentonite clay.

According to a preferred embodiment of the invention, the polysaccharide comprises granulated carboxy methyl cellulose.

According to a preferred embodiment of the invention, the super absorbent polymer comprises granulated polyacrylamide.

According to a preferred embodiment of the invention, the polymer flocculant comprises a granulated high-performance polymer flocculant.

According to a preferred embodiment of the invention, the pond sealing formulation comprises about 73% by weight bentonite clay, 7% by weight polyacrylamide, 13% by weight polysaccharide, and 7% by weight flocculant.

According to another preferred embodiment of the invention, a pond sealing formulation comprises about 71.5% by weight bentonite clay, 7.1% by weight polyacrylamide, 12.5% by weight polysaccharide, and 8.9% by weight flocculant.

Another embodiment of the invention comprises a method of rendering ground substantially impermeable to water comprising providing a kit comprising bentonite clay, a super absorbent polymer, a polysaccharide, and a polymer flocculant, and applying the bentonite clay to the ground, applying the super absorbent polymer to the ground, applying the polysaccharide to the ground; and applying the polymer flocculant to the ground.

According to an embodiment of the invention, the bentonite clay comprises #16 Wyoming bentonite clay, the super absorbent polymer comprises granulated polyacrylamide, the polysaccharide comprises granulated carboxy methyl cellulose, and the polymer flocculant comprises a granulated high-performance polymer flocculant.

According to another embodiment of the invention, the polymer flocculant comprises 2-Propenoic Acid, polymer with 2-Promenamide, sodium salt 90-100%.

According to another embodiment of the invention, the kit comprises 71-73% by weight bentonite clay, 7-8% by weight polyacrylamide, 12-13% by weight polysaccharide, and 7-9% by weight polymer flocculant.

According to another embodiment of the invention, the bentonite clay is applied to the ground first, the super absorbent polymer is applied to the ground second, the polysaccharide is applied to the ground third, and the polymer flocculant is applied to the ground fourth.

Another embodiment of the invention comprises a method of making a body of water, in which the following steps are performed in order. A bed of soil is provided, and 2000 to 3000 pounds of bentonite clay per acre of soil is applied to the bed. About 200 pounds of polyacrylamide per acre of soil is applied to the bed, about 350 pounds of a polysaccharide per acre of soil is applied to the bed, and about 250 pounds of a polymer flocculant per acre of soil is applied to the bed.

According to an embodiment of the invention, the soil is compacted after being treated.

According to another embodiment of the invention, the bed of soil is filled with water.

According to another embodiment of the invention, the bentonite clay comprises #16 Wyoming bentonite clay.

According to another embodiment of the invention, the bentonite clay comprises medium plug type Wyoming bentonite clay comprised of chips and/or rocks approximately ⅜ inch in diameter or larger.

According to another embodiment of the invention, the polyacrylamide is granulated.

According to another embodiment of the invention, the polysaccharide comprises granulated carboxy methyl cellulose.

According to another embodiment of the invention, the polymer flocculant comprises a granulated high-performance polymer flocculant.

According to another embodiment of the invention, the polymer flocculant comprises 2-Propenoic Acid, polymer with 2-Promenamide, sodium salt 90-100%.

Another embodiment of the invention comprises a method of treating an existing pond or lake to improve retention of water in the pond or lake. The method comprises providing a kit comprised of materials for applying to a bed of the pond or lake to make the bed more impermeable to water, and providing a delivery apparatus comprising a watercraft and a spreader device carried on the watercraft and adapted for dispersing the kit materials to the bed of the pond or lake. The watercraft is positioned on the water and the kit materials are dispersed into the water via the spreader device.

According to another embodiment of the invention, the spreader device comprises a hopper adapted for containing the kit materials therein. The hopper has an opening and a cover member that is moveable between a closed position wherein the cover member covers the opening preventing the kit materials from flowing through the opening, and an open position wherein the cover member does not cover the hopper opening, thereby allowing the kit materials to flow freely through the hopper opening.

According to another embodiment of the invention, the delivery apparatus includes a global positioning system tracking device operatively connected to the hopper, wherein the global positioning system tracking device maintains a record of the area travelled by the watercraft while the hopper is open, and a record of the area travelled by the watercraft while the hopper is closed.

According to another embodiment of the invention, the delivery apparatus includes a computing device comprising a computer processor and a non-transitory computer readable storage medium having programming instructions that, when executed, cause the computing device to send a signal to the global positioning system tracking device when the hopper is open.

According to another embodiment of the invention, wherein the kit of materials is comprised of bentonite clay, a super absorbent polymer, a polysaccharide, and a polymer flocculant.

According to another embodiment of the invention, the bentonite clay is dispensed into the water first, the super absorbent polymer is dispensed into the water second, the polysaccharide is dispensed into the water third, and the polymer flocculant is dispensed into the water fourth.

According to another embodiment of the invention, about 2000 to 3000 pounds of bentonite clay per acre is dispensed into the water at a rate of approximately 0.046 pounds per square foot, about 200 pounds of polyacrylamide per acre is dispensed into the water at a rate of approximately 0.004 pounds per square foot, about 350 pounds of the polysaccharide per acre is dispensed into the water at a rate of approximately 0.008 pounds per square foot, and about 250 pounds of the polymer flocculant per acre is dispensed into the water at a rate of approximately 0.006 pounds per square foot.

Another embodiment of the invention comprises an apparatus for treating an existing pond or lake to improve retention of water in the pond or lake. The apparatus comprises a kit comprised of materials adapted to be applied to a bed of the pond or lake to make the bed more impermeable to water, and a delivery apparatus adapted to dispense the materials into the pond or lake. The delivery apparatus comprises a watercraft and a spreader device carried on the watercraft. The watercraft is positioned on the water and the kit materials are dispersed into the water via the spreader device.

According to another embodiment of the invention, the spreader device comprises a hopper adapted for containing the kit materials therein. The hopper has an opening and a cover member that is moveable between a closed position wherein the cover member covers the opening preventing the kit materials from flowing through the opening, and an open position wherein the cover member does not cover the hopper opening, thereby allowing the kit materials to flow freely through the hopper opening.

According to another embodiment of the invention, the delivery apparatus includes a global positioning system tracking device operatively connected to the hopper, wherein the global positioning system tracking device maintains a record of the area travelled by the watercraft while the hopper is open, and a record of the area travelled by the watercraft while the hopper is closed.

DETAILED DESCRIPTION OF PREFERRED EMBODIMENTS

Figure 1:
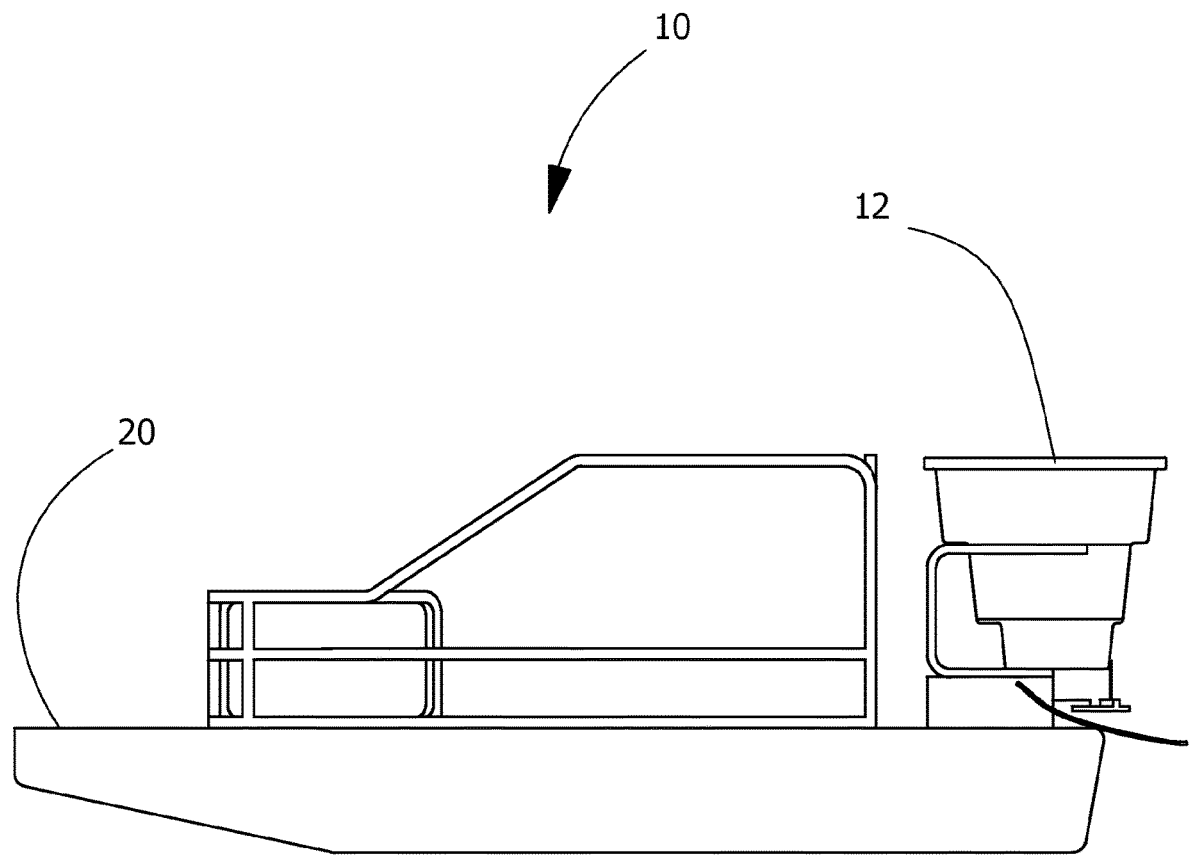
FIG. 1 is a side view of a delivery apparatus according to an embodiment of the invention.
Figure 2:
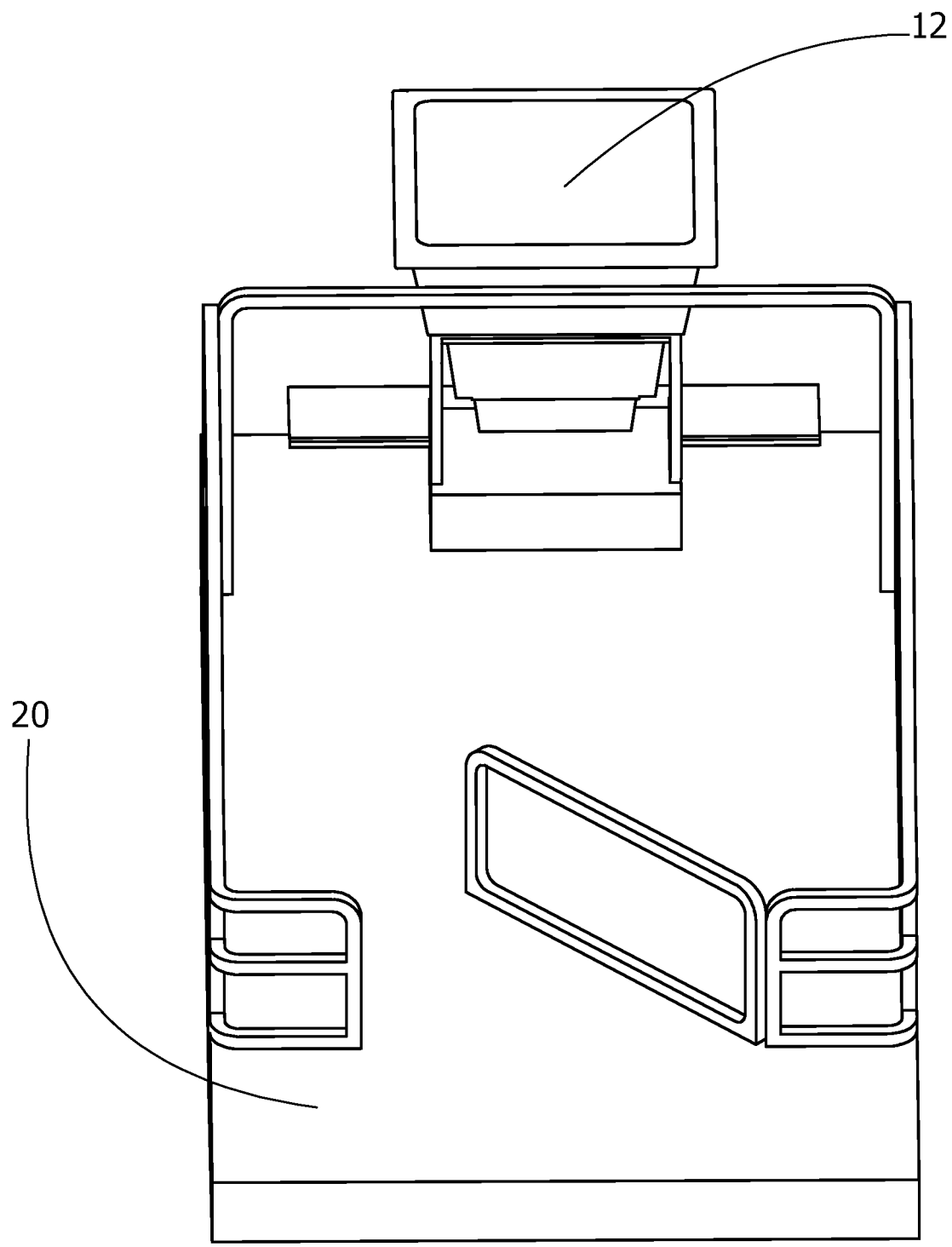
FIG. 2 is a top view of the delivery apparatus of FIG. 1.
Figure 3:
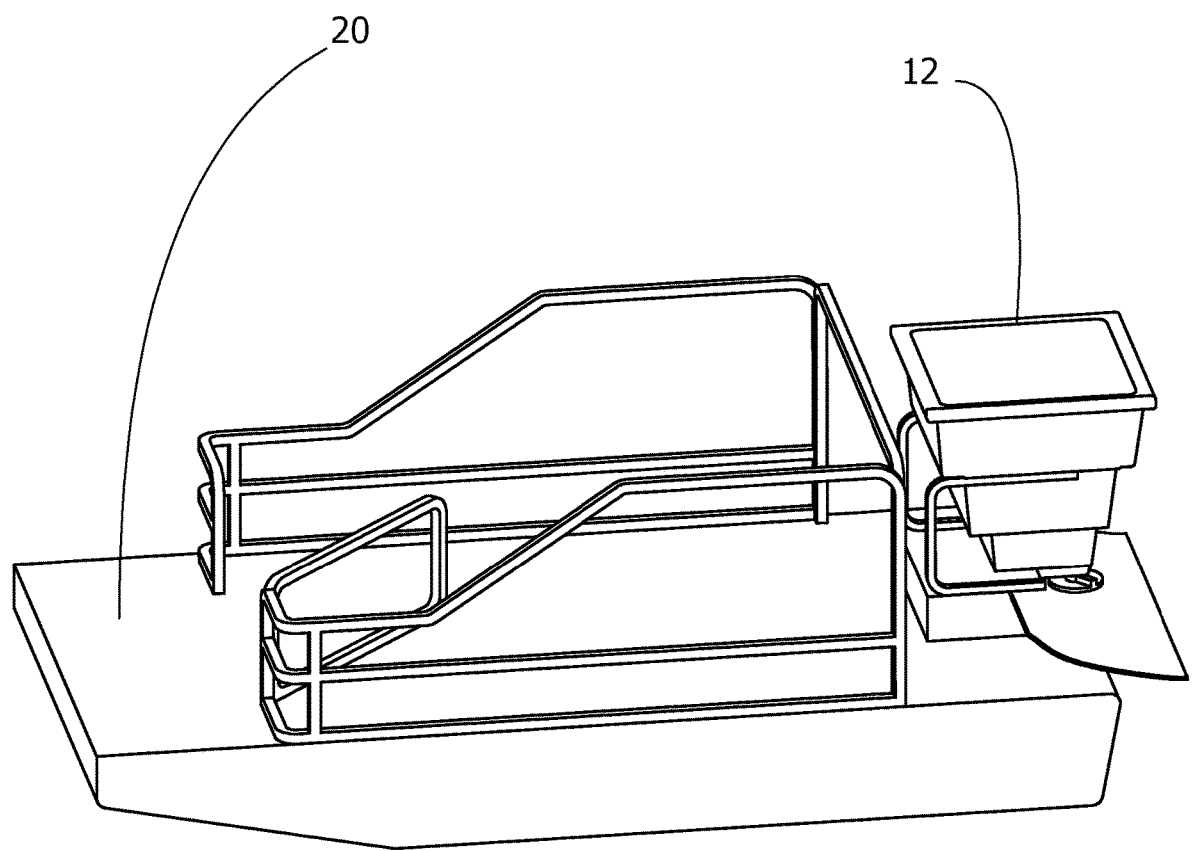
FIG. 3 is a perspective view of the delivery apparatus of FIG. 1.
Figure 4:
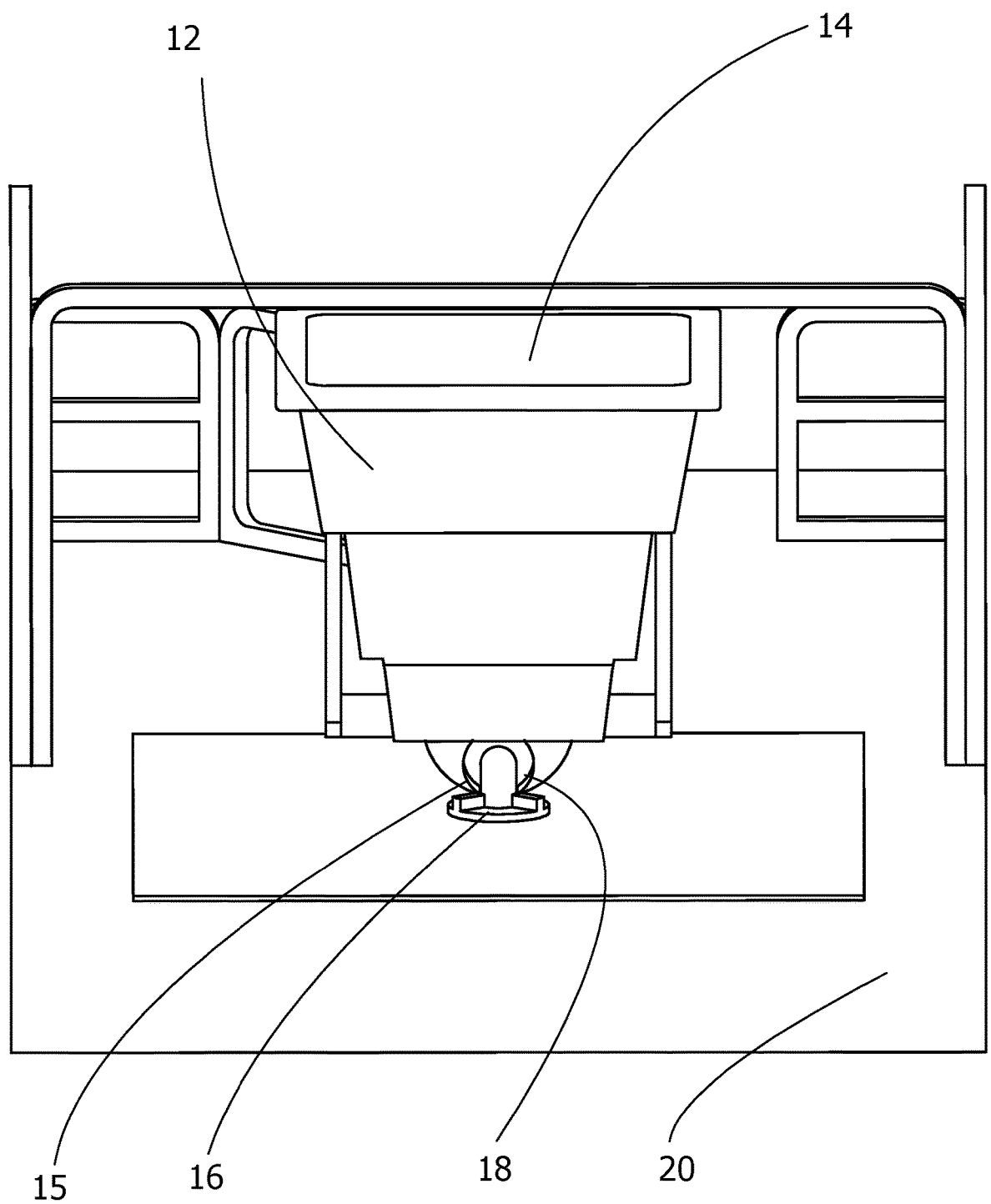
FIG. 4 is a partial perspective view of the delivery apparatus of FIG. 1.

Methods of sealing a pond, lake or similar body of water, according to preferred embodiments of the invention, are described herein. The methods disclosed herein can be used in connection with the construction of new ponds and lakes, and can also be used to prevent leakage in existing ponds, lakes and other bodies of water. The following description discloses various embodiments of the invention, and is not intended to limit the scope of the invention in any way. The terms "pond" and "lake", as used in this application, refer generally to bodies of water that are enclosed by land, including but not limited to, ponds, lakes, lagoons, and basins.

A method of sealing a pond, according to a preferred embodiment of the invention, comprises treating the ground at the bed of the pond with bentonite clay, a super absorbent polymer, a polysaccharide, and a polymer flocculant. Preferably, the bentonite clay is granulated #16 Wyoming bentonite clay, the super absorbent polymer comprises granulated polyacrylamide, the polysaccharide is granulated carboxy methyl cellulose, and the polymer flocculant is a high-performance polymer flocculant, such as 2-Propenoic Acid, polymer with 2-Promenamide, sodium salt 90-100%.

The following method is adapted for treating one acre of a pond that already contains water. First, approximately 2000 pounds of granulated Wyoming bentonite clay is spread over one acre of pond floor soil at a rate of approximately 0.046 pounds per square foot. Second, 200 pounds of super absorbent granulated polyacrylamide is spread at approximately 0.004 pounds per square foot. Third, 350 pounds of granulated carboxy methyl cellulose is spread over the one acre of pond floor at a rate of approximately 0.008 pound per square foot. Lastly, 250 pounds of granulated high-performance polymer flocculant is spread on the one acre of pond floor at a rate of approximately 0.006 pounds per square foot. It is critical that the above-referenced materials are spread in the above-referenced order in the above-referenced amounts. This method can be used in both waterborne applications (e.g., existing ponds containing water) and dry applications (e.g., pond beds with no water). In waterborne application, these materials can be dispersed onto the pond floor using a delivery apparatus adapted for pond sealing.

A delivery apparatus, according to a preferred embodiment of the invention, is illustrated in FIGS. 1-7 and shown generally at reference numeral 10. The delivery apparatus 10 comprises a spreader device 12 mounted on a watercraft such as a pontoon boat 20. The spreader device 12 comprises a hopper 14 for holding material therein, an opening 15 formed proximate the bottom of the hopper 14, an open/close gate 18 for selectively exposing and covering the opening, and an impeller 16 positioned proximate the opening 15. The open/close gate 18 can be operatively connected to an electronic hopper remote control 32, and the impeller 16 can be operatively connected to an electronic impeller speed remote control 36. The open/close gate 18 can be operatively connected to the hopper remote control 32 by a wire 42, and the impeller 16 can be operatively connected to the impeller speed remote control 36 by a wire 46, shown in FIG. 6. Alternatively, the open/close gate 18 can be operatively connected to the hopper remote control 32 and the impeller 16 can be operatively connected to the impeller speed remote control 36 via wireless communication technology sold under the mark "BLUETOOTH".

The hopper remote control 32 has electronic volume/output controls for increasing and decreasing spread volumes. The hopper remote control 32 can control the degree to which the open/close gate 18 covers the opening of the hopper 14, ranging from completely open to varying degrees of closure, to complete closure. The impeller speed remote control 36 can vary the speed of the impeller 16 and completely stop the impeller 16. As such, the user can control the rate of flow of material. Material flow can be stopped with a press of a button, thereby minimizing waste. In addition, the apparatus 10 helps prevent over application where material has already been spread, and volume adjustment can be easily made. Also, spread patterns to the left or right can be offset, and spread width can be controlled by varying the speed of the impeller 16.

Figure 5:
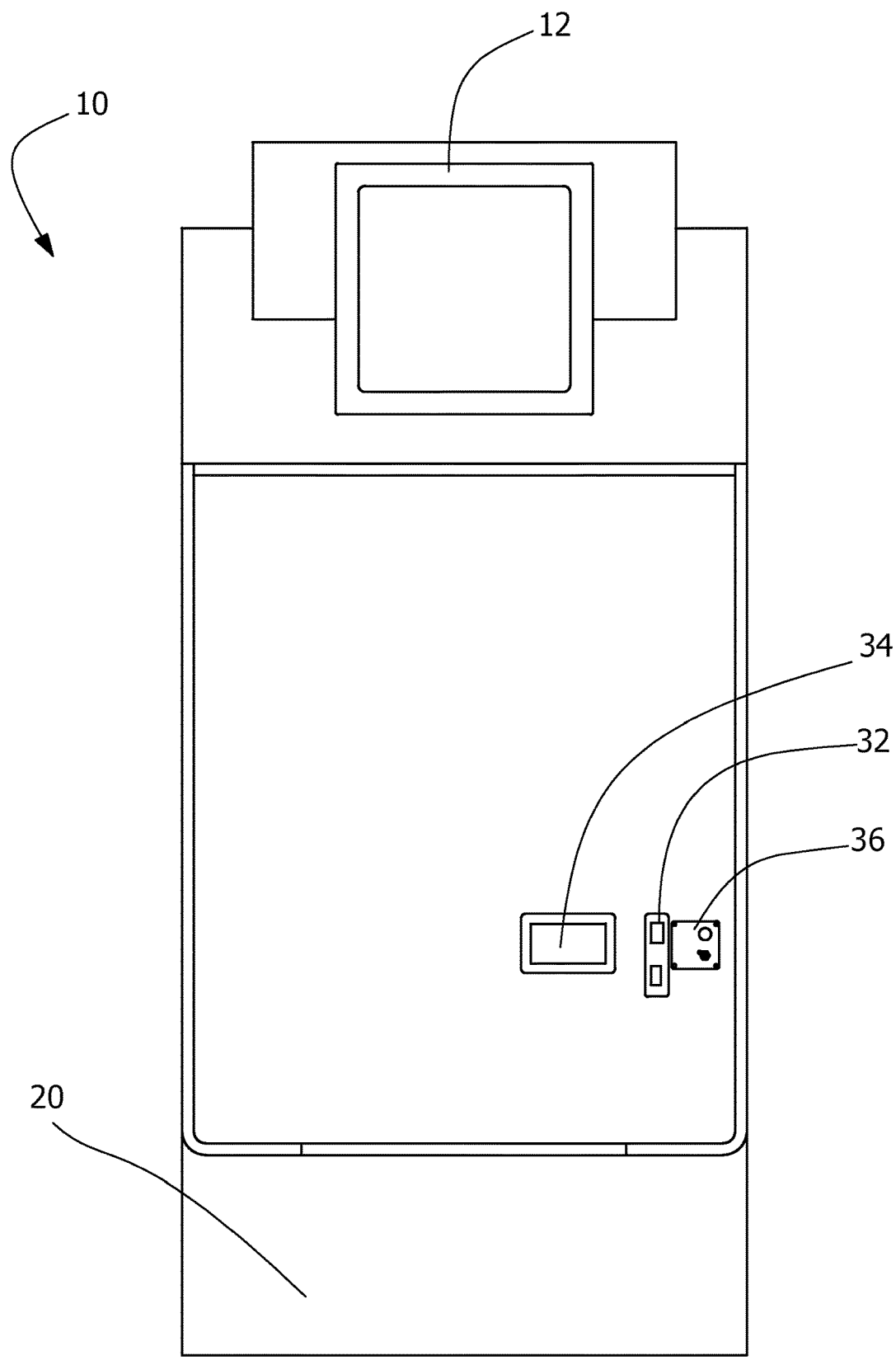
FIG. 5 is a top plan view of the delivery apparatus of FIG. 1.
Figure 6:
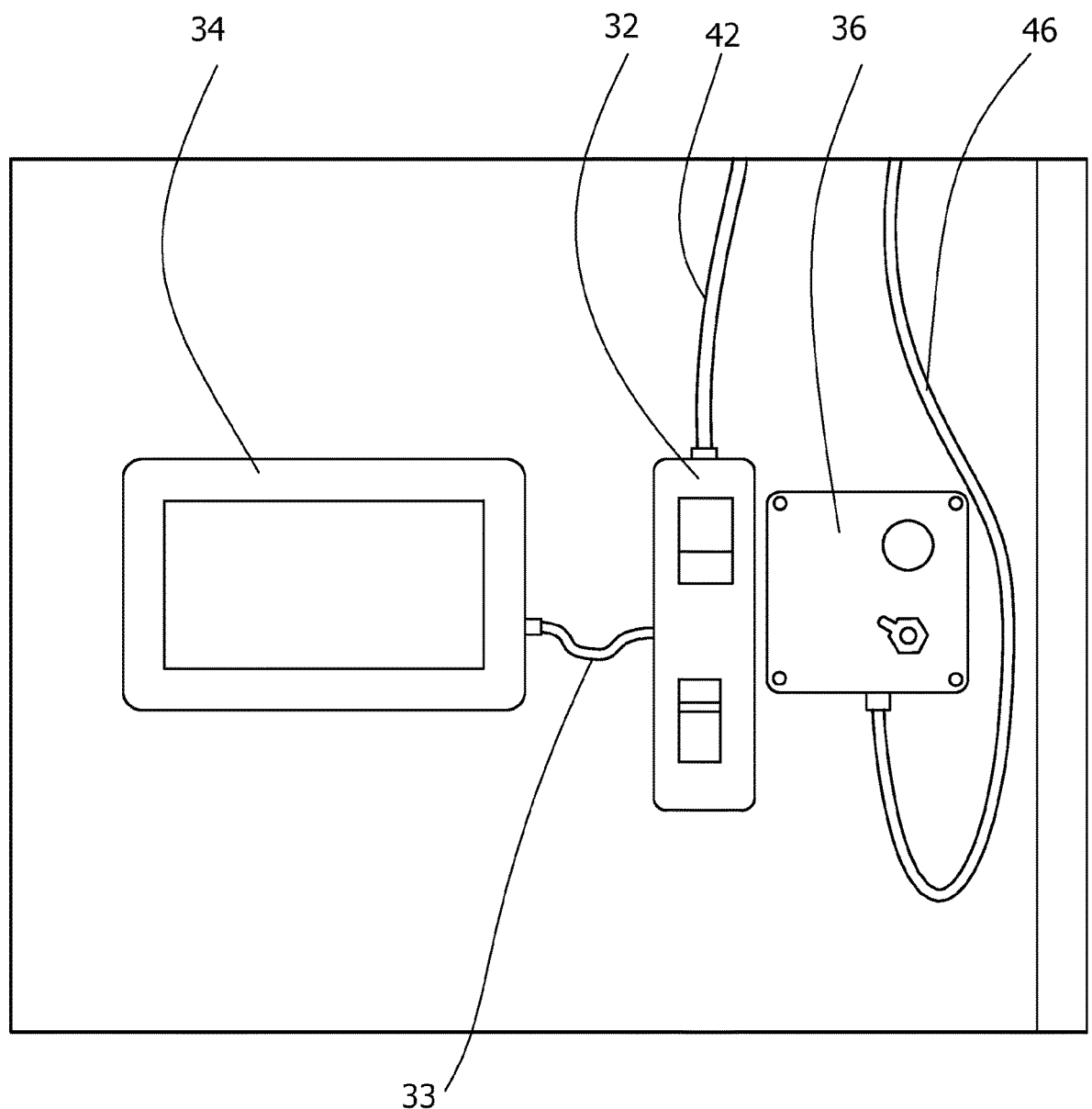
FIG. 6 is a partial top view of the delivery apparatus of FIG. 1.
Figure 7:
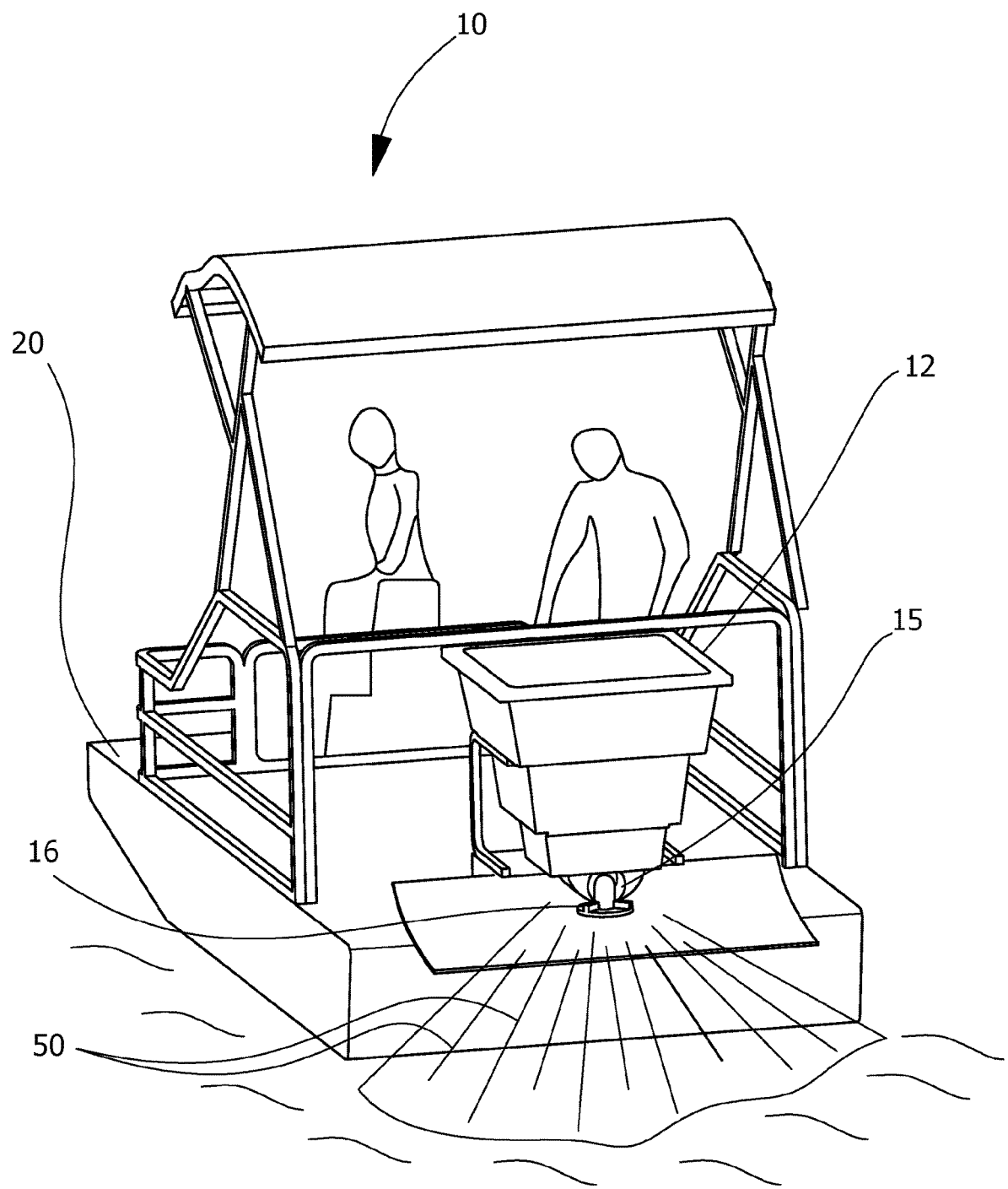
FIG. 7 is a perspective environmental view of the apparatus of FIG. 1.

According to a preferred embodiment, the delivery apparatus 10 can utilize the global positioning system (GPS). A GPS tracking device 34 can be positioned on the pontoon boat 20 and operatively connected to the hopper remote control 32 by a wire 33, as shown in FIGS. 5 and 6. Alternatively, the hopper remote control 32 can be operatively connected to the GPS tracking device 34 via wireless communication technology sold under the mark "BLUETOOTH".

The instant that a switch on the hopper remote control 32 is moved to the "open" position, the open/close gate 18 of the hopper 14 is opened and a signal is sent via the wire 33 to the GPS tracking device 34 that causes the GPS tracking device 34 to start mapping. When the switch on the hopper remote control 32 is moved to the "closed" position, the open/close gate 18 covers the hopper opening 15 and a signal is sent via the wire 33 to the GPS tracking device 34 causing the GPS tracking device 34 to stop mapping. As such, the GPS tracking device 34 maps when the hopper opening 15 is open and material is being dispensed, thereby showing a user which areas of the pond/lake have been treated.

According to an embodiment of the invention, a computing device can be operatively connected to the hopper remote control 32 and the GPS tracking device 34. The computing device can comprise a computer processor and a non-transitory readable storage medium having programming instructions that, when executed, cause the computing device to send a signal to the GPS tracking device 34 when the hopper remote control 32 opens the hopper 12.

The GPS tracking device 34 can comprise the GPS lightbar guidance system sold by TEEJET. The GPS lightbar guidance system 34 can map the pond/lake to be treated to obtain the correct acreage to ensure that material is not over applied or under applied. In addition, the GPS lightbar guidance system helps the user to accurately establish spread width and spread patterns to minimize over application or under application by painting the spread pattern/width blue on the screen. If the delivery apparatus 10 travels into a previously covered area the screen shows red and immediately prompts the user to correct steering in one direction or the other to minimize overlap. If a spot is missed, the GPS lightbar guidance system 34 shows the user where so the delivery apparatus 10 can come back and cover missed area. It directs the user to return to the exact same spot to start spreading operations again after returning from the shore with the next load of materials. It can also be configured to show speed and output volumes. The GPS lightbar guidance system 34 facilitates accurate spreading of materials in many varying patterns from square to round and other shapes. It allows the user to record the job at hand and print a report that can be given to the owner of the project to prove that all areas previously agreed upon have been thoroughly covered.

According to another preferred embodiment of the invention, in dry applications (little or no moisture present), prior to treatment the pond is cleaned and thoroughly prepped by disking or preferably roto tilling the soil into a fluffy and soft condition. At this point, the above-described materials can be applied in the same order and at the same rates as described above, or at higher rates depending on substrate. The soil is then thoroughly compacted by a tractor or other equipment and a heavy smooth drum roller until all soil is thoroughly and uniformly compacted. For ponds or lakes with rocky, hard, craggy, open fissure type substrates, materials can be broadcast by hand or hand-held equipment and no compaction is needed in such extreme conditions.

According to another preferred embodiment of the invention, a method of treating pond floors comprised of rocky, craggy and/or sandy substrates in dry or waterborne conditions comprises providing (per acre of soil to be treated): 3,000 pounds of bentonite clay, 200 pounds of a super absorbent polymer (such as polyacrylamide), 350 pounds of granulated carboxy methyl cellulose, and 250 pounds of a high-performance flocculant (such as 2-Propenoic Acid, polymer with 2-Promenamide, sodium salt 90-100%). Preferably, the super absorbent polymer has a granule size of approximately ⅛-inch diameter. The bentonite clay can be #16 granulated Wyoming bentonite clay. Alternatively, the bentonite clay can be medium plug type Wyoming bentonite clay comprised of chips/rocks approximately ⅜ inch in diameter or larger. Alternatively, the bentonite clay can be comprised of a combination of #16 granulated Wyoming bentonite clay and the medium plug type Wyoming bentonite clay. The amounts of all materials can be increased where there are extremely poor soil and compaction issues.

The 3000 pounds of bentonite clay can be spread over one acre of pond floor soil at a rate of approximately 0.046 pounds per square foot. Next, the 200 pounds of super absorbent polymer can be spread at approximately 0.004 pounds per square foot. Next, the 350 pounds of granulated carboxy methyl cellulose is spread over the one acre of pond floor at a rate of approximately 0.008 pound per square foot. Lastly, the 250 pounds of the high-performance polymer flocculant is spread on the one acre of pond floor at a rate of approximately 0.006 pounds per square foot.

Another embodiment of the invention comprises a pond/lake clarifying process for newly built ponds and lakes and/or older established ponds and lakes that stay muddy or turbid looking. The process utilizes a liquid polymer emulsion comprising a diluted high-performance polymer flocculant in liquid form suspended in a light mineral oil solution. The high-performance polymer flocculant can be 2-Propenoic Acid, polymer with 2-Promenamide, sodium salt 90-100%.

The emulsion product can be dispersed at the rate of 25 gallons per acre for clarification purposes. The emulsion can also be utilized in the pond/lake sealing methods described above to enhance sealing capability. The emulsion can be dispersed using a portable one-inch gasoline powered water pump drawing water from the pond/lake via a suction hose placed in the water. Water is metered into the pump through the suction hose utilizing a one-half inch venturi type suction line with a metering valve placed into a five-gallon pail of liquid emulsion polymer. The valve controls the rate of flow from the five-gallon pail. The emulsion is metered in slowly to prevent the pump from clogging with polymer. The mixed solution is then uniformly and evenly dispersed into the pond from multiple locations via a one-inch discharge hose coming from the pump. The solution can be dispersed from the banks of the pond or dispersed from a boat on larger projects. The mixed solution forms a large floating cloud in the pond/lake that generally stays suspended for up to three days. While the mixed solution is suspended it locks onto soil and silt particles that are also suspended in the water, thereby encapsulating them, and slowly taking them to the bottom of the pond/lake and essentially gluing them to the bottom of said pond/lake.

This pond/lake clarification process can be repeated as often as necessary on newly established ponds and lakes wherever water tends to become cloudy, murky, turbid, or muddy due to run off from surrounding areas as the pond or lake fills and stabilizes. Once the pond or lake fills to capacity and is stable and clarified, no additional treatment may be necessary for up to five years or more. Older established ponds and lakes can also benefit from this clarification process as it helps to keep ponds and lakes from becoming muddy, murky, cloudy, or turbid looking after major rain events. Also, the process can help temporarily seal small leaks and seeps under some circumstances. Preferably, the clarification process is carried out when no rain is expected for at least three days after treatment.

A method of pond sealing is described above. Various changes can be made to the invention without departing from its scope. The above description of the invention is provided for the purpose of illustration only and not limitation—the invention being defined by the claims and equivalents thereof.

What is claimed is:

1. A method of rendering ground substantially impermeable to water comprising the steps of:
   (a) providing a kit comprising bentonite clay, a super absorbent polymer, carboxy methyl cellulose, and a polymer flocculant;
   (b) spreading the bentonite clay over the ground;
   (c) spreading the super absorbent polymer over the ground;
   (d) spreading the carboxy methyl cellulose over the ground; and
   (e) spreading the polymer flocculant over the ground.

2. The method according to claim 1, wherein the bentonite clay comprises #16 Wyoming bentonite clay.

3. The method according to claim 1, wherein the super absorbent polymer comprises granulated polyacrylamide.

4. The method according to claim 1, wherein the polymer flocculant comprises a granulated high-performance polymer flocculant.

5. The method according to claim 1, wherein polymer flocculant comprises 2-Propenoic Acid, polymer with 2-Promenamide, sodium salt 90-100%.

6. The method according to claim 1, wherein the super absorbent polymer comprises polyacrylamide, and further wherein the kit comprises 71-73% by weight bentonite clay, 7-8% by weight polyacrylamide, 12-13% by weight carboxy methyl cellulose, and 7-9% by weight polymer flocculant.

7. The method according to claim 1, wherein the bentonite clay is applied to the ground first, the super absorbent polymer is applied to the ground second, the carboxy methyl cellulose is applied to the ground third, and the polymer flocculant is applied to the ground fourth.

8. The method according to claim 1, wherein the carboxy methyl cellulose is granulated.

9. A method of making a body of water comprising the following steps in order:
   (a) providing a bed of soil;
   (b) applying about 2000 to 3000 pounds of bentonite clay to the bed per acre of soil at a rate of approximately 0.046 pounds per square foot;
   (c) applying about 200 pounds of polyacrylamide to the bed per acre of soil at a rate of approximately 0.004 pounds per square foot;
   (d) applying about 350 pounds of a polysaccharide to the bed per acre of soil at a rate of approximately 0.008 pounds per square foot; and
   (e) applying about 250 pounds of a polymer flocculant to the bed per acre of soil at a rate of approximately 0.006 pounds per square foot.

10. The method according to claim 9, wherein the polysaccharide comprises granulated carboxy methyl cellulose.

11. The method according to claim 9, further comprising the step of compacting the soil.

12. The method according to claim 11, further comprising the step of filling the bed of soil with water.

13. The method according to claim 9, wherein the bentonite clay comprises #16 Wyoming bentonite clay, the polyacrylamide comprises granulated polyacrylamide, the polysaccharide comprises granulated carboxy methyl cellulose, and the polymer flocculant comprises a granulated high-performance polymer flocculant.

14. A method of treating an existing pond or lake to improve retention of water in the pond or lake, the method comprising:
(a) providing a kit comprised of materials for applying to a bed of the pond or lake to make the bed more impermeable to water, the kit comprising bentonite clay, a super absorbent polymer, a polysaccharide, and a polymer flocculant;
(b) providing a delivery apparatus comprising a watercraft and a spreader device carried on the watercraft and adapted for dispensing the kit materials into the pond or lake;
(c) positioning the watercraft on the water of the lake or pond and dispensing the kit materials into the pond or lake via the spreader device;
(d) dispensing about 2000 to 3000 pounds of bentonite clay per acre into the water at a rate of approximately 0.046 pounds per square foot;
(e) dispensing about 200 pounds of polyacrylamide per acre into the water at a rate of approximately 0.004 pounds per square foot;
(f) dispensing about 350 pounds of the polysaccharide per acre into the water at a rate of approximately 0.008 pounds per square foot; and
(g) dispensing about 250 pounds of the polymer flocculant per acre into the water at a rate of approximately 0.006 pounds per square foot.

15. The method according to claim 14, wherein the spreader device comprises a hopper adapted for containing the kit materials therein, the hopper having an opening and a cover member that is moveable between a closed position wherein the cover member covers the opening preventing the kit materials from flowing through the opening and an open position wherein the cover member does not cover the hopper opening thereby allowing the kit materials to flow freely through the hopper opening.

16. The method according to claim 15, wherein the delivery apparatus further comprises a global positioning system tracking device operatively connected to the hopper, wherein the global positioning system tracking device maintains a record of the area travelled by the watercraft while the hopper is open.

17. The method according to claim 14, wherein polymer flocculant comprises 2-Propenoic Acid, polymer with 2-Promenamide, sodium salt 90-100%.

18. The method according to claim 14, wherein the polysaccharide comprises granulated carboxy methyl cellulose.

* * * * *